Figure 1:
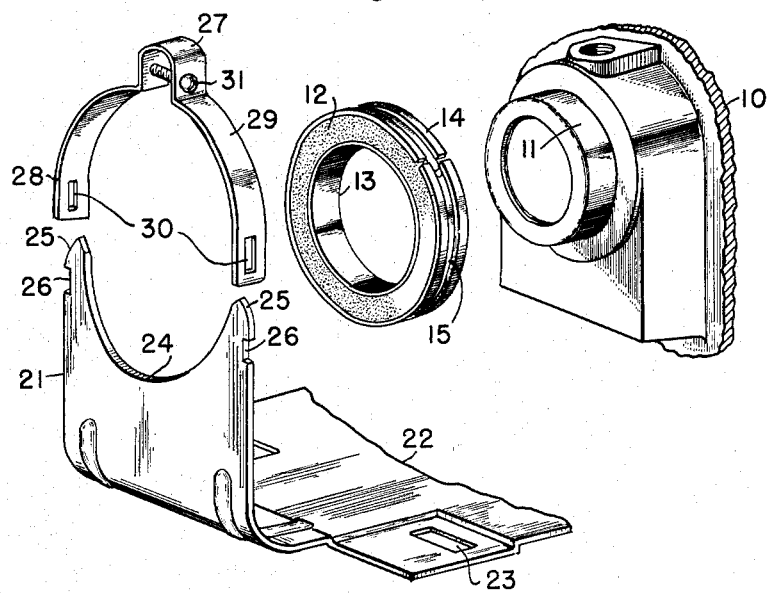

Jan. 10, 1956    T. W. REED    2,729,846
MOUNTING RING
Filed Jan. 26, 1954

INVENTOR.
Thomas W. Reed
BY *Watt, Mackey & Burden*
HIS ATTORNEYS

United States Patent Office 2,729,846
Patented Jan. 10, 1956

2,729,846

MOUNTING RING

Thomas W. Reed, Cleveland, Ohio, assignor to The F. Hohlfelder Company, Cleveland, Ohio, a corporation of Ohio Application January 26, 1954, Serial No. 406,291

1 Claim. (Cl. 16—109)

The present invention relates to a mounting ring adapted to support a resilient member in a receiver. For example, my ring may be used in a mounting for resiliently supporting a dynamo-electric machine or the like.

More particularly, a mounting which is used to support apparatus which vibrates in operation, such as the dynamo-electric machine, includes a resilient annulus, usually of rubber, which houses a hub, shaft, or similar part. A ring fits around the outer periphery of the annulus and carries and supports it in suitable holding means such as a clamp. For various reasons, it is the practice to manufacture such rings with split or spaced apart ends. One advantage of this construction lies in the resultant ease of assembling the parts previously mentioned. A split ring very readily slips over the annulus which, because of its rubbery nature, would otherwise frictionally resist a tight fit. The annulus is then quickly inserted in place in the clamp. The space between the split ends of the ring does not militate against its function and usually, due to the tightening of the clamp, the ring is compressed and the ends thereof urged together.

The use of split rings in the manner described has led to a practical and quite serious problem. During manufacture, the mounting rings are subjected to a number of processes such as sandblasting and plating. Because of the relatively small size of each ring, it is necessary, in order to make the process commercially feasible, to process in bulk at one time a large number of the rings in substantially a helter-skelter manner with the rings promiscously intermixed. To reach and process the entire surface area of each ring, it is necessary to space apart sufficiently the ends of the split ring, although in many instances this spacing is no more than that required for the ease of assembly previously mentioned. In any event, while processing rings of this construction, it very often happens that one or more rings slip through the spaced apart ends of one or more other rings so that appreciable numbers become very badly intertangled. Accordingly, additional labor and considerable time are required to separate the snarled rings and fit them for use.

I have found that this entire problem may be avoided without interfering with any surface area that must be treated such as by sandblasting or by a plating solution. In my mounting ring, one of the split ends has a recess and the other has a projection adapted to fit within the recess. These parts, however, are free of contact with each other, and at least at one point the projection is spaced from the recess a distance less than the smallest dimension of the ring. Accordingly, it is impossible for one ring to pass through the spaced ends of another and become intertangled, and yet at all times the ends are sufficiently spaced apart to permit the foregoing or other treatments and to allow the ring to be easily slipped over a resilient annulus. If the ring is compressed during service in the mounting, the projection and recess are free to move into engagement and therefore do not interfere with the function of the ring in the mounting.

Figure 2:
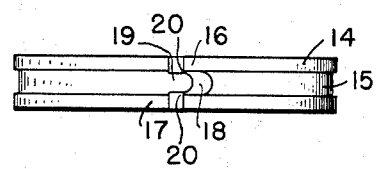
Figure 3:
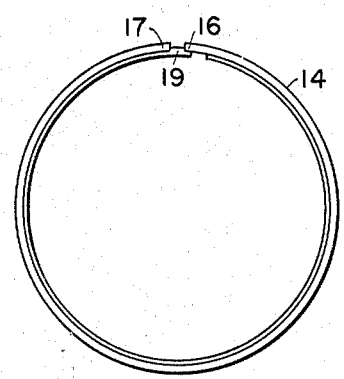

The accompanying drawing illustrates a presently preferred embodiment wherein:

Figure 1 is a perspective exploded view of a resilient mounting using my mounting ring, and Figures 2 and 3 are plan and side elevations, respectively, of the mounting ring.

Referring to the drawing, an end shield 10 of a dynamo-electric machine has a hub 11 adapted to be received by a resilient annulus 12. The annulus has an inner metal ring 13, preferably bonded thereto, and an outer ring 14 embodying the features of my invention. The ring 14 has a circumferential groove 15 and spaced apart ends 16 and 17. End 16 has a recess 18, while end 17 has a projection 19 adapted to fit within the recess. The projection and recess are free of contact, and at least at points 20 the projection is spaced from the recess a distance less than the smallest dimension of the ring. Because of the spaced apart ends, ring 14 has a sufficient circumferential length to be very easily fitted over the outer periphery of the annulus 12. A receiver or holding means for the annulus and rings includes a support 21 having an integral base 22 provided with bolt holes 23. The support 21 has a curved edge 24 which engages the groove 15 of the ring 14 and thereby prevents its lateral movement. The curved edge 24 terminates in projections 25 having side niches 26. A U-shaped clamp 27 having legs 28 and 29 provided with slots 30 fits over the support 21 and inserts the tips of the legs in the niches 26 and the slots 30 over the projections 25. Upon tightening a bolt 31, which may be threaded in the leg 28, the legs are drawn together forcing the groove 15 into firm frictional engagement with the curved edge 24 of the support. While only one end of the mounting for the dynamo-electric machine is shown, it is understood that the base 22 is extended and terminates on the other side of the dynamo-electric machine in a support and mounting similar to those just described.

Instead of using the inner band 13, the resilient annulus 12 may have projections and a circumferential rib on this inner periphery which engage complementary notches and a circumferential groove on a hub similar in location and function to hub 11.

In view of the foregoing, it will be apparent that rings like ring 14 may be handled helter-skelter in bulk without one ring slipping between the projection 19 and the recess 18 to produce intertangling. At the same time, the gaps between the projection and the recess at the points 20 are sufficiently large to expose those surfaces to sandblasting, plating, and similar treatments. Further, such a ring is easily fitted over a resilient annulus and upon compression of the ring as by the U-shaped clamp 27 engaging the support 21, the projection 19 and recess 18 may be forced into engagement without interfering with the function of the ring in the mounting assembly.

While the foregoing disclosure describes a presently preferred embodiment and a modification thereof, it is understood that the invention may be practiced in still other forms within the scope of the following claim.

I claim:

A split ring adapted to enclose a resilient annulus and mount the same in a holding device, said ring having a depressed means, having sidewalls and a bottom wall, defining a circumferential groove thereabout adapted to engage the holding device, the ends of the split ring being normally spaced apart and adapted to be closed under compression when so mounting the annulus, said groove defining means at one extremity of the ring having a slot approximating the groove in width and located in its entirety in the groove defining means below the outer surface of said ring, and at the other extremity having an integral tongue approximating the bottom of the groove in width and projecting therefrom and located in its entirety between the outer and inner surfaces of the ring, but below the outer surface of said ring, the shape of said tongue being complementary to but smaller than the slot so that the tongue is normally free of contact with the slot and is nearer in distance in at least at one point than the smallest dimension of the ring whereby the entire surface area of the ring is exposed for processing and a plurality of said rings may be intermixed and processed in bulk without intertangling.

References Cited in the file of this patent

UNITED STATES PATENTS

| | | |
|---|---|---|
| 1,505,035 | Lamora | Aug. 12, 1924 |
| 2,057,370 | Dehlendorf | Oct. 13, 1936 |
| 2,178,077 | Loftis | Oct. 31, 1939 |
| 2,251,398 | Clark | Aug. 5, 1941 |
| 2,638,390 | Neeme | May 12, 1953 |